United States Patent [19]

Somers

[11] 4,148,185
[45] Apr. 10, 1979

[54] DOUBLE REHEAT HYDROGEN/OXYGEN COMBUSTION TURBINE SYSTEM

[75] Inventor: Edward V. Somers, Murrysville, Pa.

[73] Assignee: Westinghouse Electric Corp., Pittsburgh, Pa.

[21] Appl. No.: 824,591

[22] Filed: Aug. 15, 1977

[51] Int. Cl.² .............................................. F02C 3/18
[52] U.S. Cl. .............................. 60/39.17; 60/39.46 G
[58] Field of Search ............ 60/39.04, 39.17, 39.46 G, 60/39.58, 39.53

[56] References Cited

U.S. PATENT DOCUMENTS

| | | | |
|---|---|---|---|
| 1,988,456 | 1/1935 | Lysholm | 60/39.17 |
| 2,476,031 | 7/1949 | Farkas et al. | 60/39.17 |
| 3,101,592 | 8/1963 | Robertson et al. | 60/39.46 G |
| 3,238,719 | 3/1966 | Harslen | 60/39.55 |
| 3,328,957 | 7/1967 | Rose | 60/39.46 G |

OTHER PUBLICATIONS

"A Role for Liquid Rocket Advanced Technology in the Electric Power Crisis" Report prepared for Rocketdyne Div. of North American Rockwell; 1971.

Primary Examiner—Louis J. Casaregola
Attorney, Agent, or Firm—F. A. Winans

[57] ABSTRACT

A gas turbine power generating system comprising, in the preferred embodiment, three gas turbine engines in series-connected flow communication employing high pressure hydrogen and oxygen as the fuel. Pre-heated pressurized steam (or a steam and water mixture) is fed to the initial gas turbine combustor for combustion coolant. Steam, consisting of the products of combustion plus the vaporized coolant, is exhausted from the first turbine into the combustor of the next turbine for re-heating via the combustion therein of the high pressure hydrogen and oxygen. The exhaust steam from the intermediate turbine is in turn re-heated in the combustor of the final turbine. The final exhaust steam is then passed through a recuperative heat exchanger to pre-heat the pressurized cooling water so that, when injected into the first combustor, it is vaporized prior to entering the first turbine.

4 Claims, 1 Drawing Figure

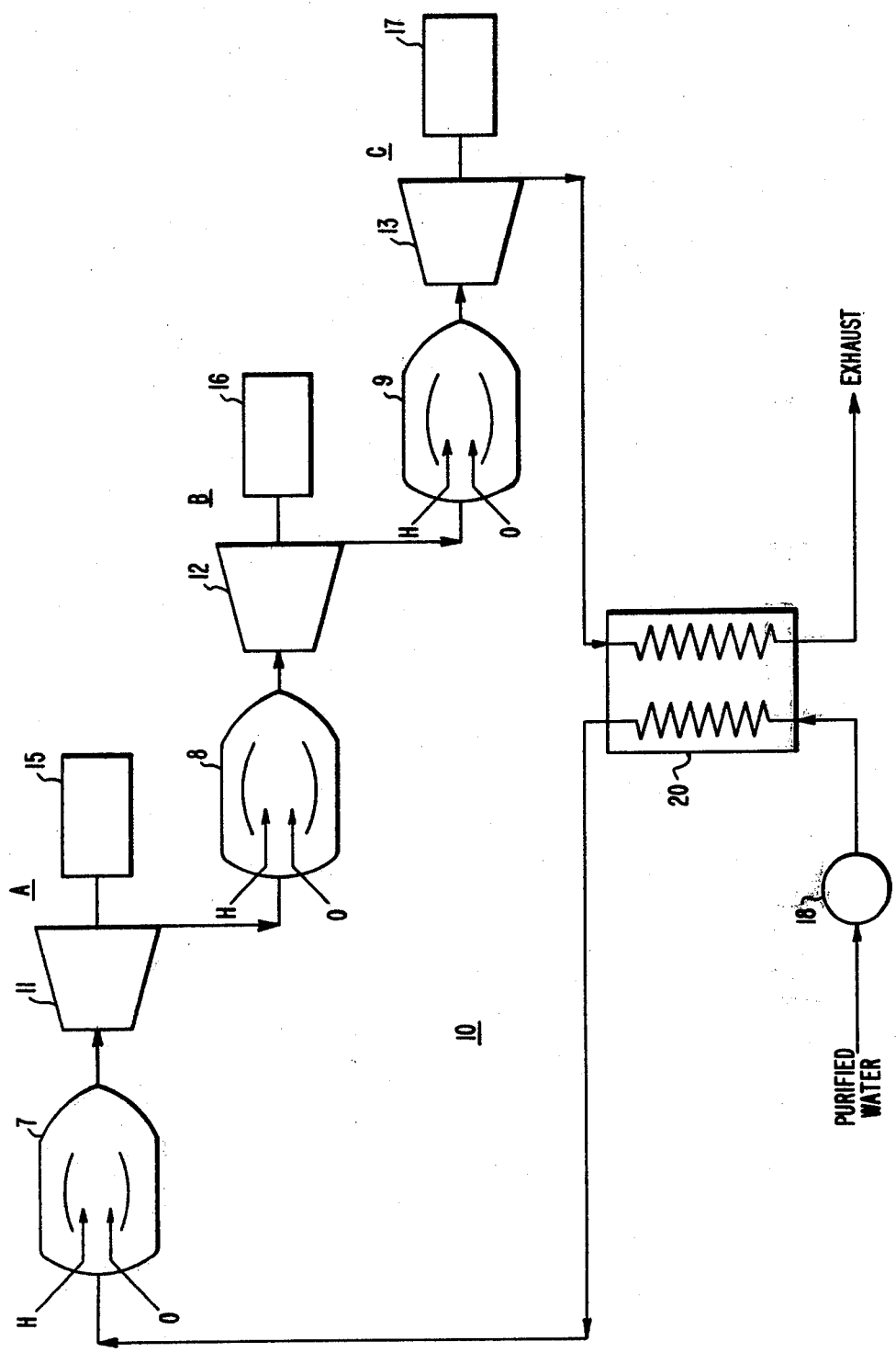

DOUBLE REHEAT HYDROGEN/OXYGEN COMBUSTION TURBINE SYSTEM

BACKGROUND OF THE INVENTION

1. Field of the Invention

This invention relates to a gas turbine generating system and more particularly to such a system using high pressure hydrogen and oxygen as the combustion fuel resulting in steam as the motive fluid of the gas turbines.

2. Description of the Prior Art

The current interest in alternative sources of energy production has lead to the investigation of the economical use of fuels other than the naturally occurring carbonaceous fuels. Recently, it has been suggested that wind-driven electric generating units be installed on the waters of the continental shelf. From such units, hydrogen could be produced electro-chemically and transferred to the mainland as a storable fuel for use in fuel-cell power generators. (See Proceedings of the 8th Annual Marine Technology Conference, September, 1972, pp. 435–466 "Power From the Off-Shore Winds," by W. E. Heronemus.)

Also, the generation of power from the combustion of hydrogen and oxygen cryogenic propellants has been suggested in that the electrolytic release of hydrogen from water also produces oxygen which can also be stored for subsequent combustion to generate power when needed. As proposed, the separately stored oxygen and hydrogen would be combusted together in the presence of a combustion flame coolant (water) to develop a motive fluid (steam) which is first passed through a heat exchanger and then to a turbine inlet. The motive fluid is exhausted from the turbine and reheated in the heat exchanger via the first passage therethrough and then delivered to the inlet of a second turbine. It is then exhausted into a condenser producing waste heat with a portion thereof being re-introduced into the combustor for again cooling the combustion process. (See Escher Technology Associates, "A Role for Liquid Rocket Advanced Technology in the Electric Power Crisis," prepared for Rocketdyne Division, North American Rockwell, January, 1971.)

It would be expected that for such a system as the latter to have a motive fluid inlet temperature of 2100° F. or above (a typical gas turbine inlet temperature), the inlet temperature to the preceding heat exchanger would necessarily be at least as high as the initial inlet temperature to the first turbine plus the temperature rise required in the heat exchanger to raise the exhaust motive fluid from the first turbine to the inlet temperature of the second turbine. With the present turbine inlet temperatures being in the range of 2100°, it would be expected that the heat exchanger inlet temperature would be on the order to 3,000° F. This temperature requirement places design restrictions on the heat exchanger that, in all likelihood, cannot be solved economically and yet provide the long-life expected of equipment in power generating systems.

SUMMARY OF THE PRESENT INVENTION

The present invention is generally related to the latter of the two above-described concepts in that it provides a gas turbine power generation system using high pressure hydrogen and oxygen as the fuel for the gas turbines with the combustion process cooled by the introduction of water or steam so that the combustion temperature range is that of the present gas turbine technology. However, in this invention, a series of gas turbine engines are connected in series-flow communication such that the reheat of the motive fluid (the combustion of oxygen and hydrogen producing a motive fluid of steam) for the second and subsequent turbines of the system is accomplished by directly the exhaust steam of the preceding turbine into the next downstream combustor wherein the steam is reheated by the combustion therein to the next turbine inlet temperature. Such reheating process can continue for sufficient stages until the pressure of the steam exhaust is at generally atmospheric pressure. The steam is finally exhausted through a heat exchanger to pre-heat the pressurized coolant water to at least partially convert it to steam (which conversion can be completed by the combustion in the first combustion chamber or by a two-stage combustion therein) for entry into the initial combustor to cool the combustion process. The use of the combination reheat and the exhaust recuperation in the gas turbine system with hydrogen and oxygen as the combustion fuels maintains the temperature on the various parts, including the rotating members of the turbine engines, within acceptable limits for long-life operation and also increases the efficiency of the over-all power generation system.

BRIEF DESCRIPTION OF THE DRAWINGS

The FIGURE is a schematic illustration of the power generation system of the present invention.

DESCRIPTION OF THE PREFERRED EMBODIMENT

Referring to the FIGURE, a gas turbine generating system 10 is shown having three turbine generator sets A, B, C, serially connected for flow communication from the combustor 7 and through the turbine 11 of A into the combustor 8 and through the turbine 12 of B and finally into the combustor 9 and through the turbine 13 of C. Each combustor is fed high pressure hydrogen and oxygen from separate lines H, O, from an external supply, for combustion therein in an appropriate ratio to form a motive fluid of superheated steam for driving the respective turbines which in turn drive generators 15, 16, and 17 respectively.

Purified water is delivered to the inlet of combustor 7 via a pump 18 for pressurizing the water to combustor 7 inlet pressure after first passing this pressurized water through a counter flow heat exchanger 20 wherein it absorbs heat from the finally-exhausted steam or motive fluid of the turbine 13 of generator set C. The heated water, which may then be two-phase water and steam, or may be completely steam, is introduced into the combustor 7 preferably at a rate such that half of the motive fluid passing into the initial turbine 11 is from such water being vaporized by the combustion of the hydrogen and oxygen therein and the other half of the steam motive fluid is produced by the combustion process. The pressurized heated water or steam is fed into the combustor 7 as a coolant to maintain the combustion temperature therein within an acceptable temperature range so that the inlet temperature to the turbine 11 is on the order of present day gas turbine inlet temperatures of 2100° F. to 2500° F. Further, it is also necessary that all motive fluid entering the turbine 11 be steam as any water therein would cause blade damage, and to this end it may be necessary to provide a pre-combustion or submerged combustion system in the initial combustor 7 to insure that the heat added to the incoming water is sufficient for complete vaporization thereof.

The motive fluid steam exhausted from the first turbine 11 flows into the combustor 8 of the next turbine 12 at a greatly-reduced pressure wherein the combustion process therein reheats the steam to the turbine inlet temperature prior to its entry into the turbine 12.

This motive fluid is subsequently exhausted into the combustor 9 of the turbine set C wherein the pressure is less than the previous combustor but the combustion process raises the temperature of the motive fluid again to the turbine inlet temperature of turbine 13.

As the superheated steam exhausting the final turbine 13 is still at an elevated temperature, it is routed through the recuperative heat exchanger 20 to transfer its heat to the incoming pressurized water that is fed to the initial combustor 7 for flame coolant.

For the purposes of analyzing the system of the present invention, it can be assumed to conform to the following conditions:

1. The purified water is pressurized to 100 atm. (1470 psi.) at 60° F. and passed through the counter current once through heat exchanger 20 in which the otherwise waste energy from the system is recuperatively recovered.

2. The preheated water and steam is passed into the combustor 7 of turbine set A into which hydrogen and oxygen gases are simultaneously injected and allowed to react stoichiometrically to produce a mixed combustor exit fluid of steam at temperature $T_{in}$, and pressure of approximately 100 atm. This combustor 7 will probably be a two-stage combustor if the heat from the combustion of the hydrogen and oxygen within the primary zone is not sufficient to convert all the coolant fluid into a vapor. However, if sufficient exhaust heat is available from the heat exchanger to pre-heat the coolant fluid to a condition that it will be completely vaporized by a single combustion process only the primary combustion would be required.

3. The superheated steam is expanded in gas turbine 11 which drives an electrical generator and exits at a determined pressure and temperature $T_{out}$, to a second downstream combustor 8.

4. This process is continued for two reheats (i.e., combustors 8 and 9) resulting in a high temperature steam exiting from the third turbine generator set C at 1 atm. (14.7 psi.) and the determined temperature, $T_{out}$.

5. Referring to the recuperative heat exchanger, the steam exiting the final turbine 13 flows through the counter current hat exchanger 20 to supply its remaining energy to the incoming feedwater and is reduced to a temperature of 250° F. without condensation. It is then exhausted from the system. Other options involving a dry cooling condenser are possible.

A condition assumed for the process above-described and illustrated in FIG. 1, for the evaluation thereof, is that of equal pressure ratios in each of the turbine stages. The pressure ratio equals $R_p = 100/(100)^{\frac{2}{3}} = 4.65$. Given this condition and the above details of the system, the efficiency under non-isotropic efficiencies of 90, 95 and 100% of such a double reheat turbine-combustor system are very high, ranging from 54% to 56% at 1800° F. and 65% to 68% at 3000° F.

Thus, should the emphasis on energy conservation and the use of alternative fuels force the use of fuels such as hydrogen and oxygen, reliable operating turbomachinery can be designed within existing reasonably known temperature constraints using the system of the present invention.

I claim:

1. A gas turbine power generating system employing hydrogen and oxygen as the gas turbine fuel to form a motive fluid of superheated steam, said system comprising:

a plurality of gas turbine engines each having a combustion chamber in motive fluid flow communication with a turbine and wherein said gas turbine engines are in serially-connected motive fluid flow communication such that the exhaust steam exiting the upstream turbine is introduced into and reheated in the combustion chamber of the next downstream gas turbine engine, and wherein each of said gas turbine engines in said system is operatively associated with a generator; and, further including exhaust heat recuperative means wherein the exhaust steam from the last of said gas turbine engines is passed in heat-exchange relationship with pressurized water to heat said water to an elevated temperature and wherein said pressurized and heated water exiting from said heat recuperative means is fed to the combustion chamber of the first of said gas turbine engines to maintain the combustion temperature therein within a predetermined range.

2. The system according to claim 1 wherein substantially one half of said motive fluid through said first gas turbine engine is formed by the combustion of the hydrogen and oxygen fuels in the combustion chamber thereof and the remaining portion is formed by the vaporization of said heated and pressurized fluid fed to said combustion chamber.

3. A gas turbine power generating system employing hydrogen and oxygen as the gas turbine fuel to form a motive fluid of superheated steam, said system comprising:

a plurality of gas turbine engines each having a combustion chamber in motive fluid flow communication with a turbine and wherein said gas turbines are in serially-connected flow communication such that the exhaust steam of the upstream turbine is introduced and reheated in the combustion chamber of the next downstream gas turbine engine; a recuperative heat exchanger means for receiving in one flow path the exhaust steam from the last of said plurality of turbine engines and in another flow path pressurized water for heating said water to an elevated temperature resulting in a heated and pressurized water;

means for introducing said heated and pressurized water into the combustion chamber of the first of said gas turbine engines for maintaining the combustion temperature therein within a predetermined range; and wherein each of said gas turbine engines is operatively associated with a generator.

4. The system according to claim 3 wherein substantially half of said motive fluid through said first gas turbine engine is the product of combustion of the hydrogen and oxygen fuels therein and the remaining portion is formed by the vaporization of said heated and pressurized fluid fed to said combustor.

* * * * *